(12) United States Patent
Yoshikawa

(10) Patent No.: US 11,273,862 B2
(45) Date of Patent: Mar. 15, 2022

(54) STEERING CONTROL DEVICE

(71) Applicant: JTEKT CORPORATION, Osaka (JP)

(72) Inventor: Masashi Yoshikawa, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 257 days.

(21) Appl. No.: 16/279,310

(22) Filed: Feb. 19, 2019

(65) Prior Publication Data

US 2019/0263444 A1 Aug. 29, 2019

(30) Foreign Application Priority Data

Feb. 26, 2018 (JP) .............................. JP2018-031988

(51) Int. Cl.
*B62D 5/04* (2006.01)
*B60Q 9/00* (2006.01)

(52) U.S. Cl.
CPC ............. *B62D 5/0484* (2013.01); *B60Q 9/00* (2013.01); *B62D 5/046* (2013.01); *B62D 5/0481* (2013.01)

(58) Field of Classification Search
CPC .... B62D 5/0484; B62D 5/046; B62D 5/0481; B62D 5/00; B60Q 9/00
See application file for complete search history.

(56) References Cited

U.S. PATENT DOCUMENTS

| | | | |
|---|---|---|---|
| 5,682,314 A * | 10/1997 | Nishino | B60T 8/172 700/79 |
| 6,978,859 B2 * | 12/2005 | Torizawa | B62D 5/0484 180/405 |
| 8,169,168 B2 * | 5/2012 | Nagase | B62D 5/0481 318/139 |
| 9,327,759 B2 * | 5/2016 | Yamamoto | H02P 6/24 |
| 9,981,684 B2 * | 5/2018 | Matsushita | H02P 29/0241 |
| 11,018,611 B2 * | 5/2021 | Nakashima | H02P 27/08 |

(Continued)

FOREIGN PATENT DOCUMENTS

| | | |
|---|---|---|
| EP | 1 878 637 A2 | 1/2008 |
| EP | 2 168 842 A1 | 3/2010 |

(Continued)

OTHER PUBLICATIONS

Jul. 10, 2019 Search Report issued in European Patent Application No. 19159388.8.

*Primary Examiner* — Ig T An
(74) *Attorney, Agent, or Firm* — Oliff PLC

(57) ABSTRACT

A steering control device capable of suitably handling a temporary drop in a supply voltage of a vehicle is provided. An ECU includes a microcomputer, a pre-driver, and an inverter. The microcomputer generates a command signal for the pre-driver. Upon being initialized by the microcomputer, the pre-driver becomes operable to generate a drive signal for the inverter based on the command signal. The inverter converts direct current power supplied from a battery into alternating current power for a motor by operating based on the drive signal. When a drop in a voltage of the battery is detected, the pre-driver transmits an abnormal-condition detection signal to the microcomputer and stops operating by resetting a state of the pre-driver to an initial state where the pre-driver is not initialized yet. When the abnormal-condition detection signal is received, the microcomputer re-initializes the pre-driver.

4 Claims, 4 Drawing Sheets

(56) References Cited

U.S. PATENT DOCUMENTS

2008/0018280 A1* 1/2008 Maeda ................. B62D 5/0463
            318/432
2011/0264326 A1  10/2011 Iwasaki
2017/0297612 A1* 10/2017 Uryu .................... B62D 5/0481

FOREIGN PATENT DOCUMENTS

EP          3 190 698 A1    7/2017
JP         2008-013146 A    1/2008

* cited by examiner

STEERING CONTROL DEVICE

INCORPORATION BY REFERENCE

The disclosure of Japanese Patent Application No. 2018-031988 filed on Feb. 26, 2018 including the specification, drawings and abstract, is incorporated herein by reference in its entirety.

BACKGROUND OF THE INVENTION

1. Field of the Invention

The invention relates to steering control devices.

2. Description of Related Art

Electric power steering systems (EPSs) that assist steering by applying a torque of a motor to a steering mechanism of a vehicle as an assistive force are conventionally available. For example, a control device of an EPS described in Japanese Patent Application Publication No. 2008-13146 (JP 2008-13146 A) includes a control computing circuit, a gate drive circuit (pre-driver), a motor drive circuit, and a voltage drop monitoring circuit. The control computing circuit computes a current command value based on a steering wheel torque and a speed of a vehicle. The gate drive circuit generates a gate drive signal based on the current command value. The motor drive circuit operates based on the gate drive signal to supply electric power to a motor. The voltage drop monitoring circuit monitors a drop in a supply voltage of the control computing circuit. The voltage drop monitoring circuit causes the control computing circuit to stop operating when a drop in the supply voltage is detected, but causes the control computing circuit to resume operating when the supply voltage recovers to a normal state.

Pre-drivers that have a supply voltage monitoring function are available in recent years. Such a pre-driver automatically stops operating when a drop in the supply voltage is detected. Employing a control device having this type of pre-driver as a control device of an EPS may possibly arise the following disadvantage. A voltage of a battery, which is a power source of a vehicle, may be temporarily dropped by some cause. The EPS may be required to resume steering assistance when the voltage of the battery recovers from the viewpoint of, for example, reduction of a steering burden placed on a driver of the vehicle. However, the pre-driver having the supply voltage monitoring function stops operating upon detecting a drop in the voltage of the battery even though the drop in the voltage is a temporary drop. This may result in failure to resume power supply to the motor when the voltage of the battery recovers.

SUMMARY OF THE INVENTION

An object of the invention is to provide a steering control device capable of suitably handling a temporary drop in a supply voltage of a vehicle.

An aspect of the invention is a steering control device that controls a motor depending on a steering state. The motor is a source of a driving force applied to a steering mechanism of a vehicle. The steering control device includes a conversion circuit that converts direct current power supplied from a direct current power supply mounted in the vehicle to alternating current power supplied to the motor, a drive circuit that, upon being initialized, becomes operable to generate a drive signal that drives the conversion circuit, and a control circuit that, after initializing the drive circuit, generates a command signal for the drive circuit depending on the steering state. When a drop in a voltage of the direct current power supply is detected, the drive circuit transmits an abnormal-condition detection signal to the control circuit and stops generating the drive signal by resetting a state of the drive circuit to an initial state where the drive circuit is not initialized yet. When the abnormal-condition detection signal is received, the control circuit re-initializes the drive circuit.

The voltage of the direct current power supply may temporarily drop due to some cause. In this case, the drive circuit stops generating the drive signal for the conversion circuit by resetting a state of the drive circuit to its initial state. Because power supply to the motor is stopped, the motor also stops running. In a situation where the drop in the voltage of the direct current power supply is a temporary drop, resuming running the motor may be required when the voltage of the direct current power supply recovers.

With respect to this, according to the configuration described above, the drive circuit that has returned to the initial state becomes operable again by being re-initialized by the control circuit. Hence, the drive circuit resumes generating the drive signal for the conversion circuit based on the command signal generated by the control circuit when a drop in the voltage of the direct current power supply is not detected (i.e., when the voltage of the direct current power supply has recovered) after the drive circuit is re-initialized. Because power supply to the motor is resumed, the motor resumes running as well. Thus, even when the steering control device has the drive circuit that stops operating in response to a drop in the supply voltage of the vehicle, the steering control device can suitably handle a temporary drop in the supply voltage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
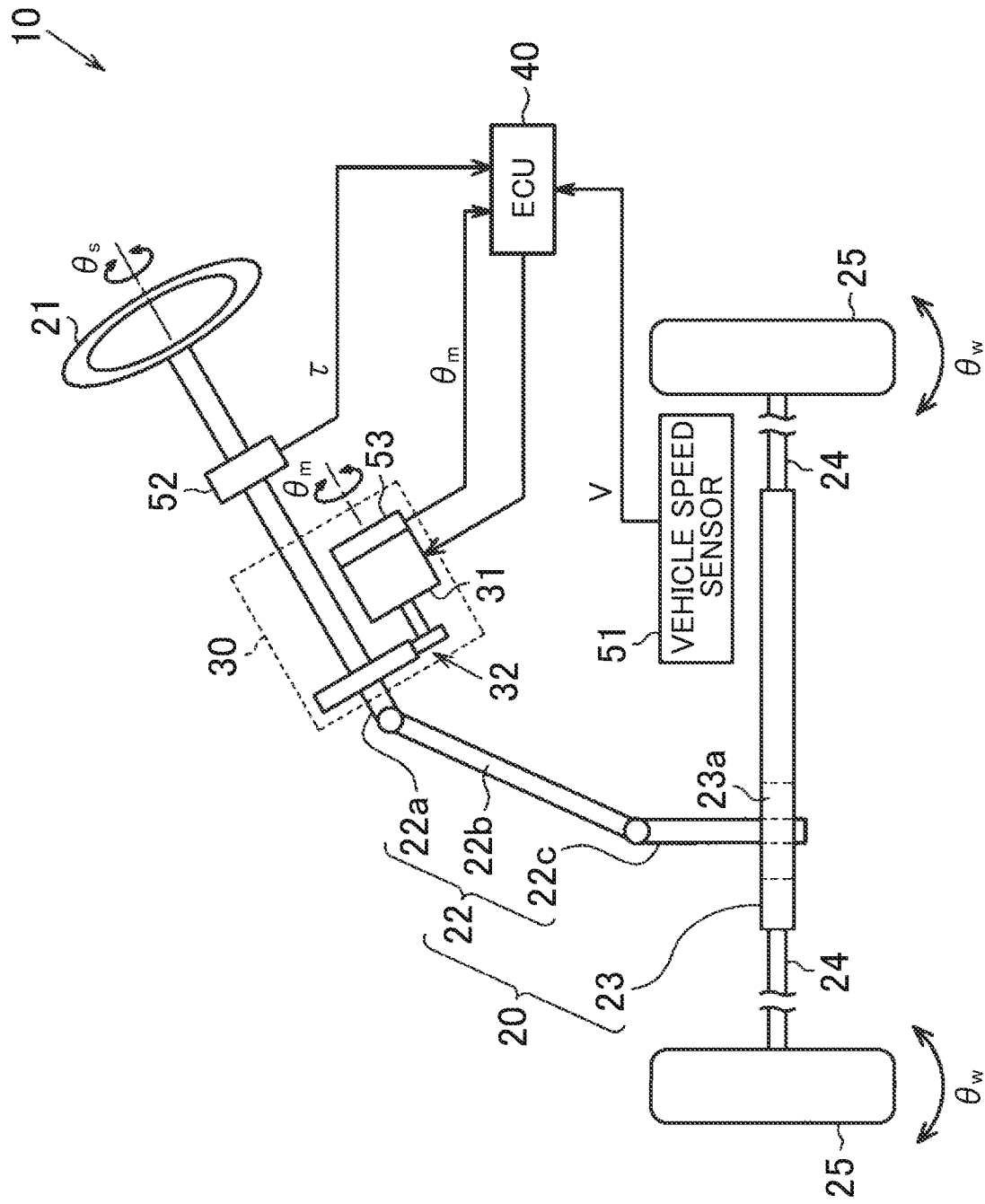
FIG. 1 is a configuration diagram of an electric power steering system, in which a steering control device according to an embodiment is mounted.

An embodiment, in which a steering control device according to the invention is embodied as a control device of an electric power steering system (EPS) of a vehicle, is described below. As illustrated in FIG. 1, an EPS 10 includes a steering mechanism 20, a steering assist mechanism 30, and an electronic control unit (ECU) 40.

The steering mechanism 20 includes a steering shaft 22 coupled to a steering wheel 21 and a steering operation shaft 23 extending in a vehicle width direction (the right-and-left direction in FIG. 1). The steering shaft 22 is formed by coupling a column shaft 22a, an intermediate shaft 22b, and a pinion shaft 22c, which are arranged in this order from the steering wheel 21 side. Pinion teeth of the pinion shaft 22c are meshed with rack teeth 23a of the steering operation shaft 23. Right and left steered wheels 25 and 25 are each coupled to a corresponding one of opposite ends of the steering operation shaft 23 via a corresponding one of tie rods 24 and 24. When the steering wheel 21 is operated to rotate, the steering operation shaft 23 moves linearly to change a steered angle $\theta_w$ of the steered wheels 25 and 25.

The steering assist mechanism 30 includes a motor 31, which is a source of an assistive force (steering assist force). As the motor 31, for example, a three-phase (U-phase, V-phase, and W-phase) brushless motor may be employed. The motor 31 is coupled to the column shaft 22a via a reduction mechanism 32. The reduction mechanism 32 reduces a rotational speed of the motor 31 and transmits a rotating force of the reduced rotational speed to the column shaft 22a. In other words, a torque of the motor 31 is applied to the steering shaft 22 as an assistive force to assist a driver's operation of the steering wheel 21.

The ECU 40 controls the motor 31 based on detection results of various sensors provided in the vehicle. Examples of the sensors include a vehicle speed sensor 51, a torque sensor 52, and a rotation angle sensor 53. The vehicle speed sensor 51 detects a vehicle speed V. The torque sensor 52 is provided on the column shaft 22a to detect a steering wheel torque τ applied to the steering shaft 22. The rotation angle sensor 53 is provided on the motor 31 to detect a rotation angle $\theta_m$ of the motor 31.

Figure 2:
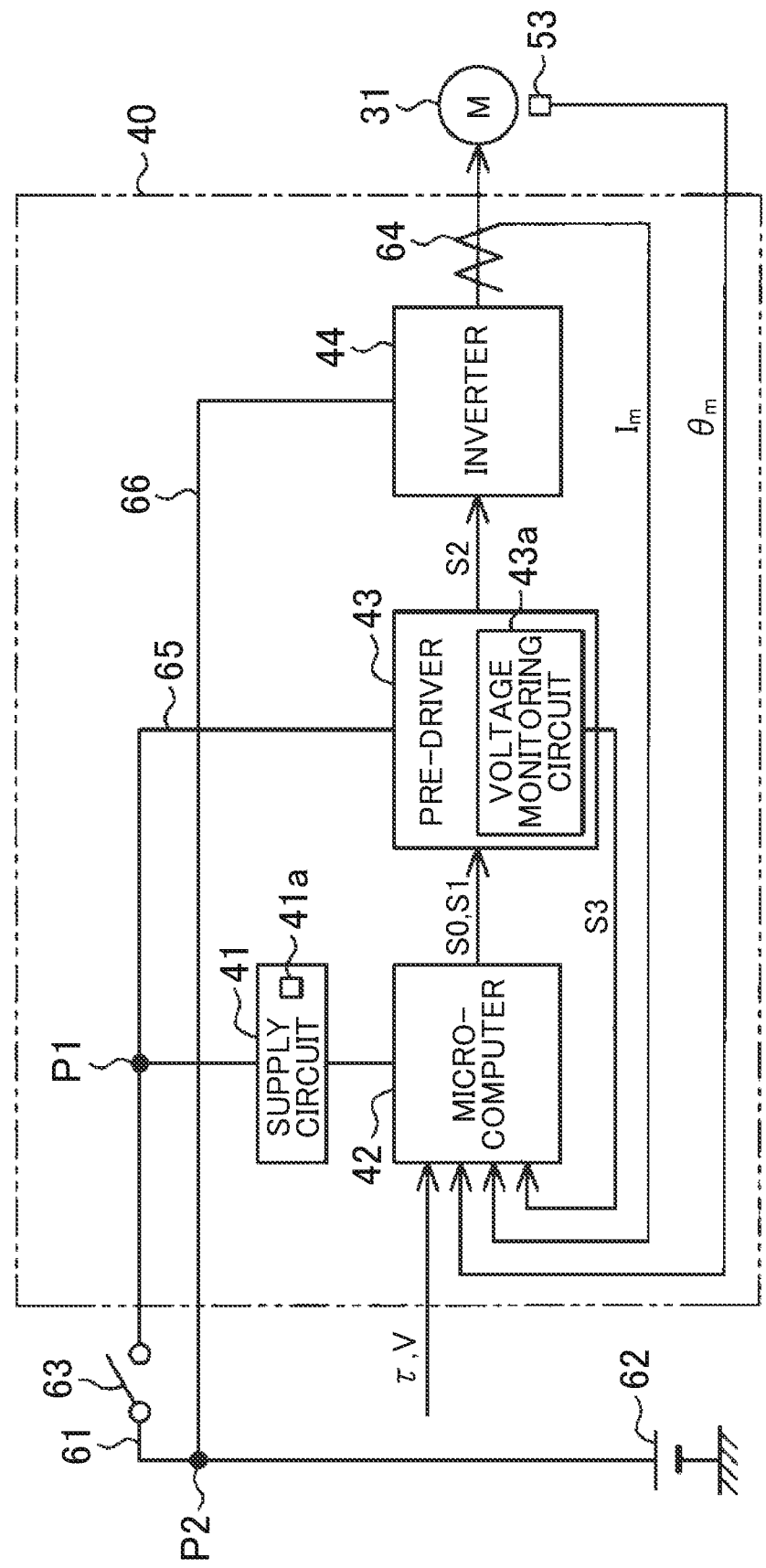
FIG. 2 is a control block diagram of an electronic control unit (ECU) in the embodiment.

A configuration of the ECU 40 is described below. As illustrated in FIG. 2, the ECU 40 includes a supply circuit 41, a microcomputer 42, a pre-driver 43, and an inverter 44.

The supply circuit 41 is connected to an in-vehicle battery 62 via a supply line 61. The supply circuit 41 converts a voltage (e.g., an initial voltage or 12 volts, which is a nominal voltage) of the battery 62 to a predetermined voltage (e.g., 5 volts) suitable for operation of the microcomputer 42 and supplies the converted voltage to the microcomputer 42. The supply circuit 41 further includes a backup circuit 41a made up of elements including, for example, an electrolytic capacitor. The backup circuit 41a is a circuit for maintaining power supply to the microcomputer 42 for a preset period of time when power supply from the battery 62 to the supply circuit 41 is stopped. Meanwhile, a supply switch 63 is provided on the supply line 61 at a position outside the ECU 40. Electrical continuity of the supply line 61 is switched on and off by operating the supply switch 63.

The microcomputer 42 initializes the pre-driver 43 when, for example, the supply switch 63 is switched from off to on. Thereafter, the microcomputer 42 performs assist control that causes the motor 31 to generate an assistive force by controlling driving of the motor 31. The microcomputer 42 computes a target assistive torque that is to be generated by the motor 31 based on the steering wheel torque τ and the vehicle speed V. The microcomputer 42 computes a current command value in accordance with the target assistive torque and performs current feedback control for causing an actual value of an electric current supplied to the motor 31 to follow the current command value, thereby generating a command signal S1 (pulse width modulation (PWM) signal) for the pre-driver 43. The microcomputer 42 controls energization of the motor 31 using the rotation angle $\theta_m$ of the motor 31 detected through the rotation angle sensor 53. The actual value of the electric current supplied to the motor 31 is detected through a current sensor 64 provided on a supply path between the inverter 44 and the motor 31.

As an abnormal-condition detection function for the inverter 44, the microcomputer 42 monitors a current value $I_m$ of the motor 31 through the current sensor 64 and detects an abnormal condition of the inverter 44 based on the current value $I_m$. When power is not supplied from the inverter 44 to the motor 31 although the microcomputer 42 is generating the command signal S1 for the pre-driver 43, for example, the microcomputer 42 determines that some abnormal condition has arisen in the inverter 44. Upon determining that an abnormal condition has arisen in the inverter 44, the microcomputer 42 stops generating the command signal S1 for the pre-driver 43 as fail-safe. This is because when an abnormal condition has arisen in the inverter 44, driving the motor 31 stably may fail.

The pre-driver 43 is connected to the battery 62 via a supply line 65. More specifically, a connection point P1 is provided on the supply line 61 between the supply switch 63 and the supply circuit 41. The supply line 65 connects between the connection point P1 and the pre-driver 43. The pre-driver 43 is initialized by the microcomputer 42. The pre-driver 43 becomes operable upon being initialized. Settings set by initialization are items that are necessary for operation of the pre-driver 43. Examples of the items include a drive voltage of the pre-driver 43 and on/offs of various functions. The pre-driver 43 generates a drive signal S2 for causing the inverter 44 to operate based on the command signal S1 generated by the microcomputer 42.

The pre-driver 43 further includes a voltage monitoring circuit 43a. The voltage monitoring circuit 43a monitors a voltage of the battery 62. When a drop in the voltage of the battery 62 is detected through the voltage monitoring circuit 43a, the pre-driver 43 stops operating (generating the drive signal S2) by resetting a state (the settings) of the pre-driver 43 to an initial state where the pre-driver 43 is not initialized yet. The initial state of the pre-driver 43 is a state where the items that are necessary for operation of the pre-driver 43 are not set yet. Examples of the items include the drive voltage of the pre-driver 43 and on/offs of various functions. When a voltage $V_b$ of the battery 62 is lower than a threshold voltage $V_{th}$ as indicated by a following equation (A), the voltage monitoring circuit 43a determines that the voltage of the battery 62 has dropped. The threshold voltage $V_{th}$ may be set based on, for example, a voltage necessary for appropriate operation of the inverter 44.

$$V_b < V_{th} \tag{A}$$

When it is determined that the voltage of the battery 62 has dropped, the pre-driver 43 generates an abnormal-condition detection signal S3 indicating that the voltage of the battery 62 has dropped and transmits the generated abnormal-condition detection signal S3 to the microcomputer 42. The abnormal-condition detection signal S3 contains information indicating that a drop in the voltage of the battery 62 has been detected and that the pre-driver 43 has been reset to return to the initial state.

The inverter 44 is connected to the battery 62 via an incoming line 66. More specifically, a connection point P2 is provided on the supply line 61 between the battery 62 and the supply switch 63. The incoming line 66 connects between the connection point P2 and the inverter 44. The inverter 44 is formed by connecting three arms, each of which is an arm that is a basic unit formed by connecting two switching elements in series and corresponds to one of the three phases, in parallel. As the switching element, for example, a field-effect transistor (FET) may be used.

The switching element of each phase performs a switching operation based on the drive signal S2 generated by the pre-driver 43 such that the inverter 44 converts direct current power supplied from the battery 62 into three-phase alternating current power. An electric current that depends on the command signal S1 is supplied to the motor 31 through the inverter 44, so that the motor 31 generates a torque in accordance with the target assistive torque. The torque of the motor 31 is applied to the steering mechanism 20 (in this case, the column shaft 22a) of the vehicle via the reduction mechanism 32 as an assistive force that assists steering performed by a driver of the vehicle.

Operations that the microcomputer 42 performs when a drop in the voltage of the battery 62 is detected are described below. The following description is based on an assumption that an instantaneous interruption has occurred to the voltage of the battery 62 in a situation where energization of the motor 31 is controlled. When the instantaneous interruption occurs, the backup circuit 41a causes power supply to the microcomputer 42 to continue. The pre-driver 43 generates the abnormal-condition detection signal S3 and stops operating.

Figure 3:
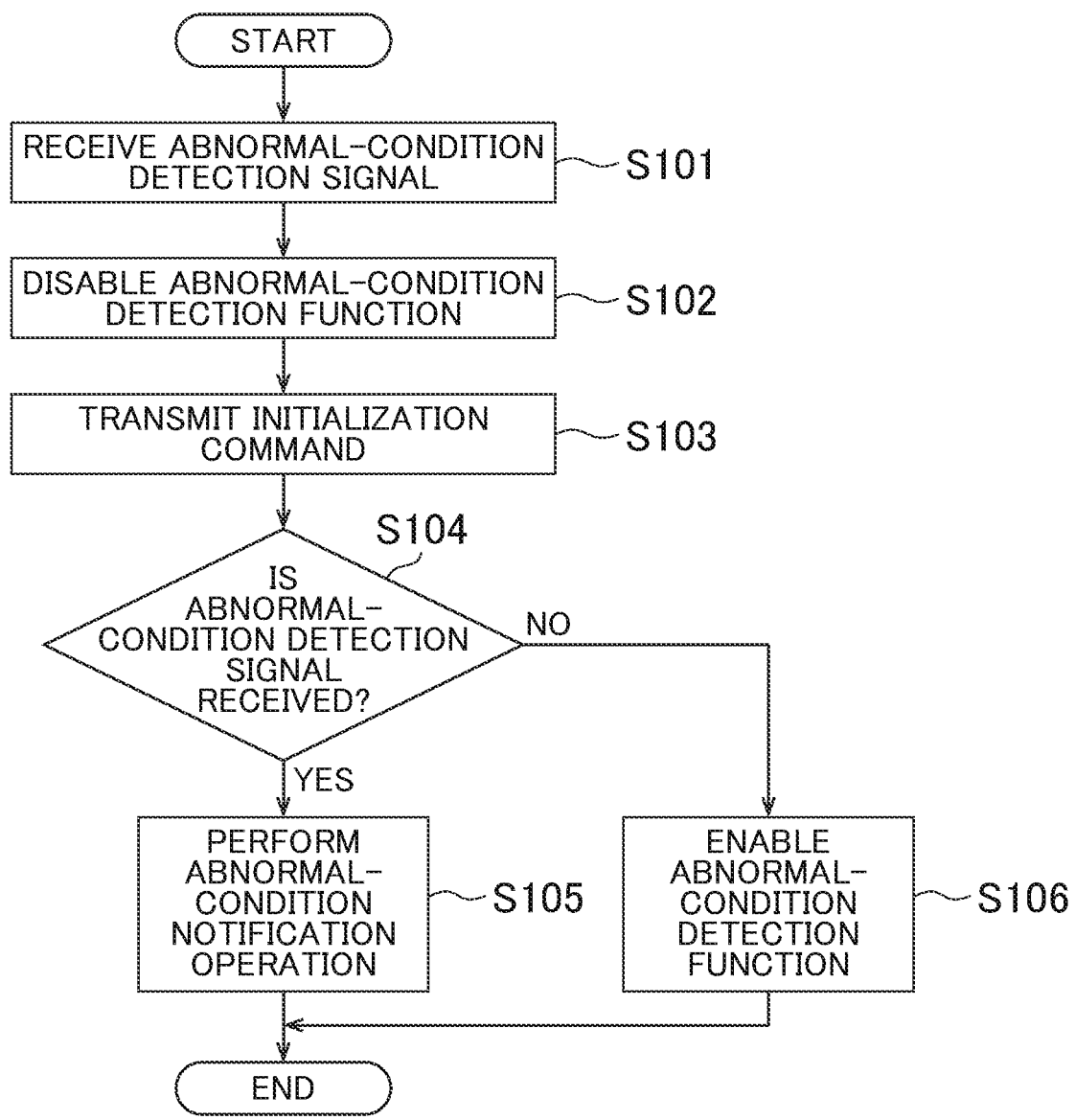
FIG. 3 is a flowchart illustrating processing steps performed by a microcomputer when a drop in a voltage of a battery is detected according to the embodiment.

As illustrated in the flowchart of FIG. 3, when the abnormal-condition detection signal S3 generated by the pre-driver 43 is received (step S101), the microcomputer 42 disables the abnormal-condition detection function for the inverter 44 (step S102). The function is disabled in order to reduce false detection made by the microcomputer 42 by falsely detecting, as an abnormal condition, a condition where the inverter 44 stops operating (stops power supply to the motor 31) due to the stoppage of operation of the pre-driver 43.

Thereafter, the microcomputer 42 transmits an initialization command S0 to the pre-driver 43 to re-initialize the pre-driver 43 (step S103). The initialization command S0 is a signal for initializing the pre-driver 43 and contains setting information necessary for operation of the pre-driver 43.

Subsequently, the microcomputer 42 determines whether the abnormal-condition detection signal S3 is received from the pre-driver 43 (step S104). When the abnormal-condition detection signal S3 is received (YES at step S104), the microcomputer 42 performs a predetermined abnormal-condition notification operation (step S105). The reason for this is as follows. The operation of the pre-driver 43 remains stopped even though the pre-driver 43 has been re-initialized. Therefore, the drop in the voltage of the battery 62 may possibly not be a temporary phenomenon, or an abnormal condition (e.g., breakage of the supply line 65) may have arisen in the pre-driver 43 or peripheral circuits of the pre-driver 43. The microcomputer 42 may switch on an alarm lamp in a vehicle compartment or issue an alarm sound through a speaker as the abnormal-condition notification operation, for example. Thus, the driver is notified of the abnormal condition. In this case, steering assist is not performed because power supply to the motor 31 is stopped.

When the microcomputer 42 does not receive the abnormal-condition detection signal S3 at step S104 (NO at step S104), the microcomputer 42 enables the abnormal-condition detection function for the inverter 44 (step S106). This is because it can be assumed that the pre-driver 43 starts operating normally because the voltage of the battery 62 has recovered from the instantaneous interruption and the pre-driver 43 has been re-initialized. When the pre-driver 43 starts operating normally, power supply to the motor 31 and, accordingly, steering assist are resumed.

Operations that the pre-driver 43 performs when a drop in the voltage of the battery 62 is detected are described below.

The following description is also based on an assumption that an instantaneous interruption has occurred to the voltage of the battery 62 in a situation where energization of the motor 31 is controlled.

Figure 4:
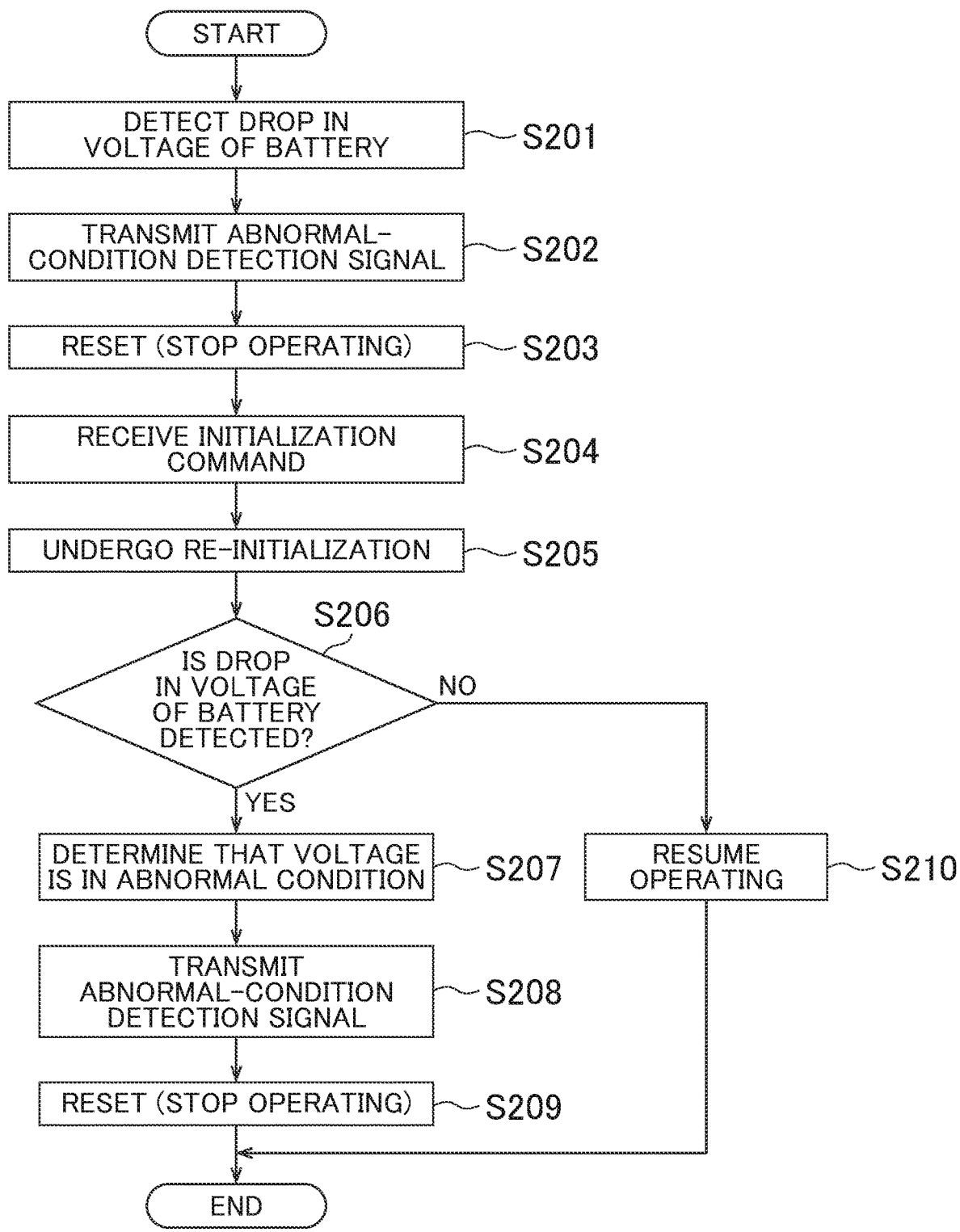
FIG. 4 is a flowchart illustrating processing steps performed by a pre-driver when a drop in the voltage of the battery is detected according to the embodiment.

As illustrated in the flowchart of FIG. 4, when a drop in the voltage of the battery 62 is detected (step S201), the pre-driver 43 transmits the abnormal-condition detection signal S3 to the microcomputer 42 (step S202) and resets the state of the pre-driver 43 to the initial state where the pre-driver 43 is not initialized yet (step S203). Thus, the pre-driver 43 stops operating or, in other words, stops generating the drive signal S2.

Subsequently, when the pre-driver 43 receives the initialization command S0 from the microcomputer 42 (step S204), the pre-driver 43 is re-initialized based on the received initialization command S0 (step S205). Thus, the pre-driver 43 is restarted (starts operating).

Subsequently, the pre-driver 43 determines whether a drop in the voltage of the battery 62 is detected (step S206). When a drop in the voltage of the battery 62 is detected (YES at step S206), the pre-driver 43 determines that the voltage of the battery 62 is in an abnormal condition (step S207) as the drop in the voltage of the battery 62 may not be a temporary drop, and transmits the abnormal-condition detection signal S3 to the microcomputer 42 (step S208). Thereafter, the pre-driver 43 resets the state of the pre-driver 43 to the initial state again (step S209) and completes processing. Thus, the pre-driver 43 stops operating or, in other words, stops generating the drive signal S2.

When a drop in the voltage of the battery 62 is not detected at step S206 (NO at step S206), the pre-driver 43 resumes operating (step S210) and completes processing. In other words, the pre-driver 43 resumes generating the drive signal S2 for the inverter 44 based on the command signal 51 generated by the microcomputer 42. Thus, power supply to the motor 31 is resumed.

Accordingly, advantages provided by the embodiment include the following:

(1) When a drop in the voltage of the battery 62 is detected, the pre-driver 43 transmits the abnormal-condition detection signal S3 to the microcomputer 42 and stops operating by resetting the state of the pre-driver 43 to the initial state where the pre-driver 43 is not initialized yet. When the abnormal-condition detection signal S3 is received from the pre-driver 43, the microcomputer 42 re-initializes the pre-driver 43. When a drop in the voltage of the battery 62 is not detected after the pre-driver 43 has been re-initialized, the pre-driver 43 resumes operating. In other words, the pre-driver 43 resumes generating the drive signal S2 for the inverter 44 based on the command signal S1 received from the microcomputer 42. Thus, even when the ECU 40 has the pre-driver 43 that stops operating in response to a drop in the voltage of the battery 62, it is possible to cause the motor 31 to resume running when the voltage of the battery 62 recovers from a temporary drop.

(2) When the abnormal-condition detection signal S3 is received from the pre-driver 43, the microcomputer 42 disables the abnormal-condition detection function (the function that monitors the current value $I_m$ of the electric current supplied from the inverter 44 to the motor 31) for the inverter 44. When the abnormal-condition detection signal S3 is not received any more after transmission of the initialization command S0, the microcomputer 42 enables the abnormal-condition detection function for the inverter 44. Thus, it is possible to reduce false detection, which is made by the microcomputer 42 by falsely detecting, as an abnormal condition of the inverter 44, a condition where the inverter 44 stops operating (stops power supply to the motor 31) due to a temporary drop in the voltage of the battery 62.

When the pre-driver 43 detects a drop in the voltage of the battery 62, the pre-driver 43 stops generating the drive signal S2, which causes the inverter 44 to stop operating. Accordingly, when the abnormal-condition detection function of the microcomputer 42 is enabled, the microcomputer 42 may undesirably falsely detect that an abnormal condition has arisen in the inverter 44 based on the fact that power is not supplied to the motor 31 even though the command signal S1 is generated, and stop performing the assist control (generating the command signal S1) as fail-safe. In this case, the microcomputer 42 does not resume performing the assist control even when the voltage of the battery 62 recovers. Thus, in a situation where the pre-driver 43 generates the abnormal-condition detection signal S3, it is preferable to temporarily disable the abnormal-condition detection function of the microcomputer 42 because the drop in the voltage may possibly be a temporary voltage drop, such as an instantaneous interruption.

(3) When the abnormal-condition detection signal S3 is received even through the microcomputer 42 has re-initialized the pre-driver 43 by transmitting the initialization command S0, the microcomputer 42 performs the predetermined abnormal-condition notification operation. Thus, it is possible to urge a driver to take some action by notifying the driver of occurrence of the abnormal condition through the abnormal-condition notification operation.

(4) When the voltage $V_b$ of the battery 62 goes below the threshold voltage $V_{th}$, the pre-driver 43 detects a drop in the voltage of the battery 62. This allows the pre-driver 43 to detect a drop in the voltage of the battery 62 appropriately with reference to the threshold voltage $V_{th}$.

(5) The EPS 10 may be required to generate an assistive force by resuming driving the motor 31 after the voltage recovers from a temporary drop, such as an instantaneous interruption. The ECU 40 according to the embodiment can cause the motor 31 to resume running when the voltage of the battery 62 recovers from a temporary drop. Therefore, the ECU 40 is suitable for the EPS 10.

The embodiment may be modified as follows. In the embodiment, when a drop in the voltage of the battery 62 is detected (YES at step S206) after re-initialization is performed at step S205 of the flowchart of FIG. 4, the pre-driver 43 immediately makes a determination that the voltage of the battery 62 is in an abnormal condition. This may be modified as follows. For example, the pre-driver 43 may determine that the voltage of the battery 62 is in an abnormal condition when a drop in the voltage of the battery 62 lasts for a predetermined threshold period of time from a point in time when the determination at step S206 of FIG. 4 is made.

In the embodiment, when a drop in the voltage of the battery 62 is not detected (NO at step S206) after re-initialization is performed at step S205 of the flowchart of FIG. 4, the pre-driver 43 immediately resumes operating. This may be modified as follows. For example, the pre-driver 43 may resume operating when a drop in the voltage of the battery 62 remains undetected for a predetermined threshold period of time from the point in time when the determination at step S206 of FIG. 4 is made.

In the embodiment, when the abnormal-condition detection signal S3 is received from the pre-driver 43 (YES at step S104) after the initialization command S0 is transmitted at step S103 of the flowchart of FIG. 3, the microcomputer 42 performs the abnormal-condition notification operation immediately. This may be modified as follows. For example, when the abnormal-condition detection signal S3 is received (YES at step S104) after the initialization command S0 is transmitted at step S103, the microcomputer 42 may repeat transmission of the initialization command S0 (step S103) and determination as to whether the abnormal-condition detection signal S3 is received (step S104) a predetermined threshold number of times. When the abnormal-condition detection signal S3 is received even though the microcomputer 42 has re-initialized the pre-driver 43 the predetermined threshold number of times, the microcomputer 42 may perform the abnormal-condition notification operation (step S105).

The microcomputer 42 may alternatively be configured not to perform the abnormal-condition notification operation when the pre-driver 43 determines that the voltage of the battery 62 is in an abnormal condition. This configuration allows omitting step S105 of the flowchart of FIG. 3 from processing performed by the microcomputer 42. In other words, when it is determined that the abnormal-condition detection signal S3 is received at step S104 (YES at step S104), the microcomputer 42 may complete processing without performing the abnormal-condition notification operation.

The abnormal-condition notification operation may be performed irrespective of whether the pre-driver 43 is reset. In this case, an element, other than the microcomputer 42, of the ECU 40 may perform the abnormal-condition notification operation.

The microcomputer 42 may alternatively be configured such that the abnormal-condition detection function for the inverter 44 is omitted from the microcomputer 42. This configuration allows omitting steps S102 and S106 of the flowchart of FIG. 3 from processing performed by the microcomputer 42. In other words, after receiving the abnormal-condition detection signal S3 from the pre-driver 43 at step S101, the microcomputer 42 may cause processing to proceed to step S103 where the microcomputer 42 transmits the initialization command S0 to the pre-driver 43. When it is determined that the abnormal-condition detection signal S3 is not received at the determination of step S104 (NO at step S104), the microcomputer 42 may terminate processing without performing further processing.

The embodiment has been described through the example, in which the ECU 40 is mounted in a steering apparatus of a type that transmits the torque of the motor 31 to (the column shaft 22a of) the steering shaft 22. Alternatively, the steering apparatus may be of a type that transmits the torque of the motor 31 to the steering operation shaft 23.

In the embodiment, the steering control device is embodied as the ECU 40 of the electric power steering system. Alternatively, the steering control device may be embodied as a control device of a steering apparatus of what is called a steer-by-wire system, in which power transmission between the steering wheel and the steered wheels is separated. This type of steering apparatus may include a reaction force motor that is a source of a steering reaction force applied to a steering shaft and a steering operation motor that is a source of a steering operation force that turns steered wheels. The control device may perform reaction force control that causes a reaction force motor to generate a steering reaction force by controlling energization of the reaction force motor. The control device may perform steering operation control that turns the steered wheels by controlling energization of the steering operation motor.

What is claimed is:
1. A steering control device that controls a motor depending on a steering state, the motor being a source of a driving force applied to a steering mechanism of a vehicle, the steering control device comprising:
- a conversion circuit that converts direct current power supplied from a direct current power supply mounted in the vehicle to alternating current power supplied to the motor;
- a pre-driver circuit that, upon being initialized, becomes operable to generate a drive signal that drives the conversion circuit, the pre-driver circuit including:
  - a voltage monitoring circuit configured to detect a drop in a voltage of the direct current power supply; and
- a control circuit that, after initializing the pre-driver circuit, generates a command signal depending on the steering state, the command signal being a pulse width modulation signal for the pre-driver circuit, and the drive signal causing the conversion circuit to operate based on the generated command signal, wherein
- when the drop in the voltage of the direct current power supply is detected by the voltage monitoring circuit, the pre-driver circuit (i) transmits an abnormal-condition detection signal to the control circuit and (ii) stops generating the drive signal by resetting a state of the pre-driver circuit to an initial state where the pre-driver circuit is not initialized yet, the abnormal-condition detection signal containing information indicating that the drop in the voltage of the direct current power supply has been detected and that the pre-driver has been reset to return to the initial state,
- when the abnormal-condition detection signal is received by the control circuit, the control circuit re-initializes the pre-driver circuit by transmitting an initialization command to the pre-driver circuit, the initialization command being a signal for initializing the pre-driver circuit and including setting information for the pre-driver circuit, and
- when the abnormal-condition detection signal is received even though the control circuit has re-initialized the pre-driver circuit, the control circuit performs a predetermined notification operation to notify a driver of the vehicle of the abnormal condition of the direct current power supply.

2. The steering control device according to claim 1, wherein
- the control circuit has an abnormal-condition detection function that detects an abnormal condition of the conversion circuit by monitoring an electric current supplied from the conversion circuit to the motor and a fail-safe function that stops generating the command signal when the abnormal condition of the conversion circuit is detected, and
- the control circuit disables the abnormal-condition detection function when the abnormal-condition detection signal is received, and enables the abnormal-condition detection function when the abnormal-condition detection signal is not received after re-initializing the pre-driver circuit.

3. The steering control device according to claim 1, wherein when the voltage of the direct current power supply goes below a threshold voltage, the pre-driver circuit detects a drop in the voltage of the direct current power supply.

4. The steering control device according to claim 1, wherein the motor generates, as the driving force, an assistive force for assisting steering of the vehicle.

* * * * *